United States Patent [19]

Clark

[11] Patent Number: 5,073,003
[45] Date of Patent: Dec. 17, 1991

[54] OPTOELECTRONIC DEVICE PACKAGE METHOD AND APPARATUS

[75] Inventor: Harold R. Clark, Fanwood, N.J.

[73] Assignee: AT&T Bell Laboratories, Murray Hill, N.J.

[21] Appl. No.: 636,872

[22] Filed: Oct. 3, 1990

Related U.S. Application Data

[62] Division of Ser. No. 289,093, Dec. 23, 1988, Pat. No. 5,017,263.

[51] Int. Cl.$^5$ .............................................. G02B 6/36
[52] U.S. Cl. ..................... 385/33; 372/36 385/31; 385/88
[58] Field of Search ..................... 357/74, 30; 372/36; 350/96.1, 96.2, 96.17

[56] References Cited

U.S. PATENT DOCUMENTS

| | | | |
|---|---|---|---|
| 4,119,363 | 10/1978 | Camlibel et al. | 350/96.20 |
| 4,233,619 | 11/1980 | Webb et al. | 357/74 |
| 4,357,072 | 11/1982 | Goodfellow et al. | 350/96.20 |
| 4,826,272 | 5/1989 | Pimpinella et al. | 350/96.17 |
| 4,897,711 | 1/1990 | Blonder et al. | 357/74 |
| 4,904,036 | 2/1990 | Blonder | 350/96.17 |
| 4,966,433 | 10/1990 | Blonder | 350/96.17 |
| 4,995,695 | 2/1991 | Pimpinella et al. | 350/96.17 |

OTHER PUBLICATIONS

"Self-Aligned Flat-Pack Fibre-Photodiode Coupling" by Hillerick, *Electronics Letters* Jul. 21, 1988, vol. 24, No. 15.

*Primary Examiner*—Akm Ullah
*Attorney, Agent, or Firm*—Roderick B. Anderson

[57] ABSTRACT

Efficient coupling between an optoelectronic device (13) and an optical fiber (15) is obtained by using different monocrystalline elements of different crystallographic orientation for mounting, respectively, the fiber and the optoelectronic device. For example, the crystallographic orientation of an upper monocrystalline element (17) is chosen such that a horizontal groove (20) for supporting the optical fiber and a reflecting surface (19) for directing light into the fiber may both be made by anisotropic etching. The crystallographic orientation of a lower monocrystalline silicon element is chosen such that appropriate etching will yield a mounting surface (23) for the optoelectronic device (13) which is suitable for directing light from the reflecting surface (19) into the optical fiber (15) with maximum efficiency. In one illustrative embodiment, the upper monocrystalline element (17) is {100} silicon, and the lower monocrystalline element (18) is {112} silicon. As will be explained more fully later, this permits anisotropic etching so as to form a V-groove (20) that supports a horizontally-extending optic fiber, a reflecting surface (19) that extends at 54.75°, and a support surface (23) for the optoelectronic device that extends at 19.48° with respect to the horizontal. These relative angles provide for optimum optical coupling between the optoelectronic device and the optical fiber, while providing horizontal surfaces for supporting both electronic circuitry and the optical fiber, as is desired for secure packaging and integration of the package apparatus into a lightwave communications system.

13 Claims, 4 Drawing Sheets

OPTOELECTRONIC DEVICE PACKAGE METHOD AND APPARATUS

This is a division of U.S. application Ser. No. 289,093 filed Dec. 23, 1988, now U.S. Pat. No. 5,017,263.

TECHNICAL FIELD

This invention relates to lightwave communication apparatus and, more particularly, to methods for making packages for optoelectronic devices, such as light-emitting diodes (LEDs).

BACKGROUND OF THE INVENTION

Optical or lightwave communications systems are presently being intensively explored because of their promise for delivering greater quantities of information over a transmission medium than is possible with conventional electrical communications systems. Fundamental to any lightwave system is a lightwave source, such as a laser or an LED; a transmission medium, such as an optical fiber; and a detector, such as a semiconductor photodetector. Optical couplers are commonly used between the source and the detector for operating on the transmitted information (e.g., monitoring, amplifying). Devices such as lasers, LEDs and photodetectors that operate both electronically and optically are known as optoelectronic devices.

The U.S. patent of Blonder et al., U.S. Pat. No. 4,897,711, granted Jan. 30, 1990, describes a number of packaging subassemblies for optoelectronic devices that appropriately align an optoelectronic device with various lenses, reflectors, and optical fiber transmission media. The supports for various optoelectronic devices and the reflecting surfaces are defined in monocrystalline silicon by taking advantage of known anisotropic etching properties of silicon. Because silicon etches preferentially along predictable crystallographic planes, various grooves, cavities and alignment detents can be quickly and easily made with great precision by masking and etching various surfaces of monocrystalline silicon support structures.

Semiconductor lasers differ from semiconductor LEDs in that they emit light from a junction periphery in a direction parallel to the junction; whereas, LEDs emit light in a direction transverse to the junction through the "top" of the device. LEDs are commonly used in conjunction with multi-mode optical fibers for providing data communications (e.g., communication between computers); whereas, lasers are commonly used in conjunction with single-mode optical fibers to provide voice and voice-related communications.

Because LEDs emit light in the vertical direction, LED packages are somewhat difficult to make because, for structural reasons, it is preferred that the optical fiber extend from the package in a horizontal direction. Bending the fiber 90° is poor practice for both structural and optical reasons. Thus, it is preferred that the LED package contain a reflector for changing the direction of the emitted light prior to transmission by the optical fiber.

The aforementioned Blonder et al. application shows in FIGS. 8 through 10 a number of optoelectronic device packages for supporting an LED such that its output is reflected into an optical fiber. While the structures shown can be easily made, they do not provide for the most efficient coupling of light into an optical fiber because the light from the LED is directed into the optical fiber at an angle with respect to the fiber axis. The most efficient coupling requires that the light be directed into the optical fiber in a direction that is parallel to the axis of the optical fiber. Accordingly, there is a need for an optical device package that is easy to make with great precision and yet provides for efficient optical coupling between an LED or other optoelectronic device and an optical fiber.

SUMMARY OF THE INVENTION

In accordance with the invention, efficient coupling between an optoelectronic device and an optical fiber is obtained by using different monocrystalline elements of different crystallographic orientation for mounting, respectively, the fiber and the optoelectronic device. For example, the crystallographic orientation of an upper monocrystalline element is chosen such that a horizontal groove for supporting the optical fiber and a reflecting surface for directing light into the fiber may both be made by anisotrophic etching. The crystallographic orientation of a lower monocrystalline silicon element is chosen such that appropriate etching will yield a mounting surface for an optoelectronic device which is suitable for directing light from the reflecting surface into the optical fiber with maximum efficiency.

In one illustrative embodiment, the upper monocrystalline element is {100} silicon, and the second monocrystalline element is {112} plane silicon. As will be explained more fully later, this permits anisotropic etching so as to form a V-groove that supports a horizontally-extending optic fiber, a reflecting surface that extends at 54.74°, and a support surface for the optoelectronic device that extends at 19.48° with respect to the horizontal. These relative angles provide for optimum optical coupling between the optoelectronic device and the optical fiber, while providing horizontal surfaces for supporting both electronic circuitry and the optical fiber, as is desired for secure packaging and integration of the package apparatus into a lightwave communications system.

These and other objects, features, advantages and embodiments of the invention will be better understood from a consideration of the following detailed description taken in conjunction with the accompanying drawing.

DETAILED DESCRIPTION

Figure 1:
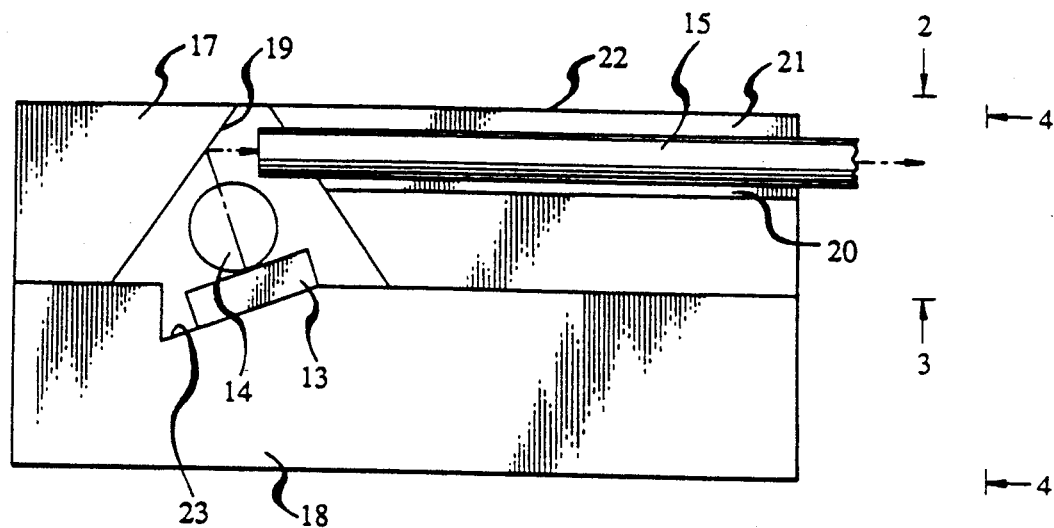
FIG. 1 is a sectional schematic view of an optoelectronic device package made in accordance with an illustrative embodiment of the invention.
Figure 2:
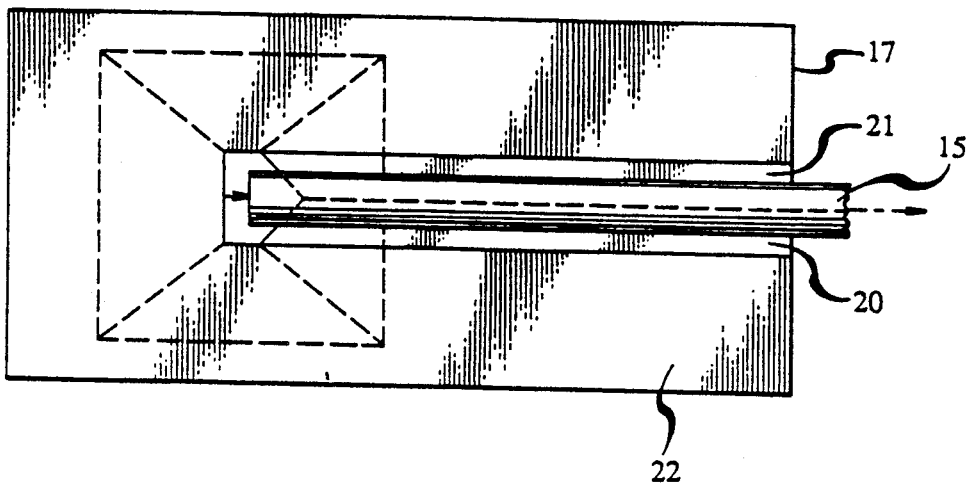
FIG. 2 is a view taken along lines 2—2 of FIG. 1, except that the optoelectronic device and lens are eliminated for the sake of clarity.
Figure 4:
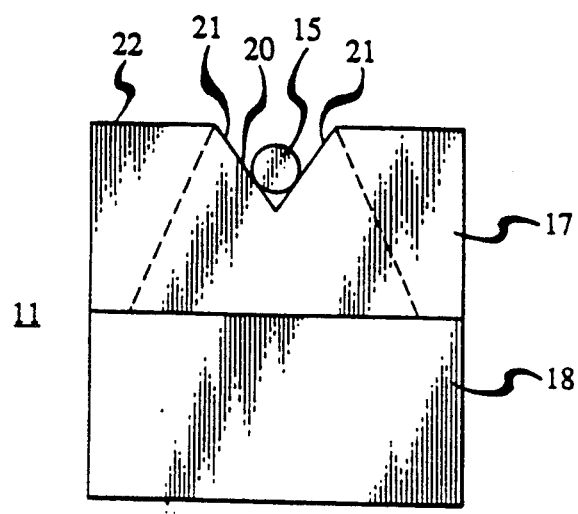
FIG. 4 is a view taken along lines 4—4 of FIG. 1.

Referring now to FIG. 1, there is shown a schematic view of an LED assembly or package 11 made in accordance with one embodiment of the invention. The purpose of the package is to provide a secure mounting for an LED 13 and an associated lens 14 such that output of the light generated by the LED is directed into an optical fiber 15. Once proper mounting surfaces have been defined, these elements may be secured within the package by epoxy or some other bonding material, as is known in the art. In accordance with this embodiment of the invention, the package 11 comprises an upper monocrystalline silicon element 17 and a lower monocrystalline silicon element 18, which have relative crystallographic orientations chosen to provide optimum mounting surfaces. A reflecting surface 19 is formed in the upper crystalline silicon element, which is metallized, as is known in the art, so as to reflect light from the LED 13 into the fiber 15. As shown more clearly in FIG. 4, the fiber 15 is contained within upper silicon element 17 by a V-groove 20 having side walls 21 that extend at 54.74° angles with the horizontal as shown.

Figure 3:
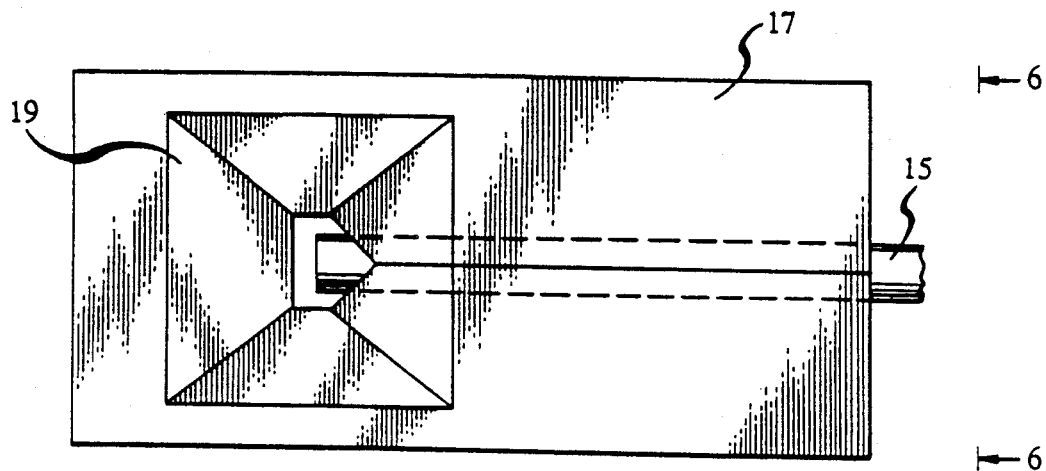
FIG. 3 is a view taken along lines 3—3 of FIG. 1, except that the optoelectronic device and lens have been eliminated for the sake of clarity.

In accordance with the invention, the upper silicon element 17 is {100} oriented monocrystalline silicon while the lower element is {112} monocrystalline silicon. As is known in the art, the V-groove shown in FIG. 4 can easily be made by photolithographic masking and etching of the {100} element. That is, with all of element 17 masked, except for an opening in the upper surface 22 corresponding to the desired location of the groove as can be appreciated from FIG. 4, an etchant will preferentially etch along the {111} crystallographic planes so as to leave side walls 21 that correspond to such planes and are at 54.74° with respect to the horizontal. Referring to FIG. 3, the element 17 is likewise masked with a rectangular opening in the lower surface of the mask. When the etchant etches, a polyhedron or pyramid of four surfaces is formed, with surface 19 having a slope at 54.74° with respect to the horizontal as a necessary consequence of the elements' crystallographic orientation. Surface 19 corresponds to the {111} plane.

Likewise, the {112} oriented silicon element 18 is masked except for an opening at its upper surface and etched so as to form a surface 23 which is parallel with the {111} crystallographic plane. It can be shown that one of the {111} planes in {112} oriented silicon is at an angle with respect to the horizontal of 19.48°. After surface 23 has been formed, it is metallized, and LED 13 is mounted on it. With reflecting surface 19 extending at 54.74 degrees, the light projected normally with respect to surface 23 will be reflected from surface 19 in a direction parallel to the V-groove in element 17, and thus parallel to the central axis of optical fiber 15 as required for maximum coupling efficiency.

Figure 5:
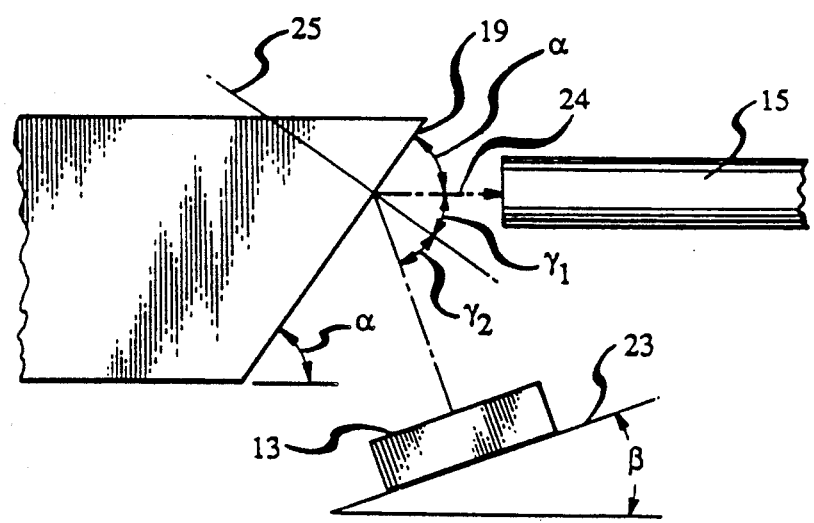
FIG. 5 is a schematic view illustrating the relevant geometry of the apparatus of FIG. 1.

The condition for relating the angle $\alpha$ that surface 19 bears to the horizontal to the angle $\beta$ of surface 23, such as to obtain reflected light that is parallel to the optical fiber axis, can be appreciated from FIG. 5, which illustrates the relevant geometry. First, consider line 19' to extend at the same angle $\alpha$ with respect to the horizontal as does the reflecting surface 19 of FIG. 1. We wish the light directed into the fiber 15 to be directed along a line 24 which is parallel with the horizontal and therefore forms an angle $\alpha$ with respect to line 19'. The exercise is to determine the angle $\beta$ which accomplishes this desired result. First, construct a perpendicular 25 through the line 19' at the point of incidence. Since the angle of incidence must equal the angle of reflection, $$\gamma_1 = \gamma_2 \quad (1)$$

Since the angle between line 24 and 19' is equal to $\alpha$, $\gamma_1$ may be expressed as $$\gamma_1 = 90° - \alpha \quad (2)$$

from geometry and from Equation (1), $$2\gamma_1 = 90° - \beta. \quad (3)$$

Then from equations 2 and 3, $$\beta = 2\alpha - 90°. \quad (4)$$

This shows that an angle $\beta$ of 19.48°, together with an angle $\alpha$ of 54.74°, will reflect light that is parallel to the horizontally-extending optical fiber axis.

A detailed discussion of different ways for forming desired crystal orientations in silicon, and etching to desired crystallographic planes, are described in some detail in the paper "Silicon as a Mechanical Material," Proceedings of the IEEE, Volume 70, No. 5, May 1982, pp. 420–457. In one experimental embodiment of the invention, masking and etching of element 18 was accomplished by first thermally growing a 0.5 micrometer thick layer of silicon dioxide a wafer from which the element 18 is to be defined on and covering this with a photolithographic mask which was patterned in a known manner. The holes in the oxide were then formed by etching in buffered hydrofluoric acid which dissolved only the unmasked silicon dioxide. The recesses in the silicon were then formed by using the patterned $SiO_2$ as a mask and etching the exposed silicon in an ethylene diamine pyrocatechol solution which produced the recess in which surface 23 is defined.

After forming the surface 23, the lower silicon element 18 was stripped of its silicon dioxide, and a new oxide layer 0.1 micrometers thick was regrown. The sample was then coated by sputtering with a 0.03 micrometer thick layer of chromium, followed by a 0.2 micrometer thick layer of gold. Careful coating with photoresist and multiple exposures and development allowed a conductor pattern to be formed which preserved the metallization over the lip of the recess. After etching away the exposed gold and chromium, the sample was re-plated with gold to a 5 micrometer thickness. This extra thickness was provided to insure sufficient current-carrying capacity for the performance of the LED without overheating the conductors and to provide a good bonding pad for the LED. Individual elements were cut from the wafer and LEDs were epoxy bonded into the etched recesses and wire bonded. A simple jig was designed and fabricated to hold the surface 23 at a horizontal angle so that the LED could be positioned, epoxied, and wire bonded with standard equipment. Spherical lenses were epoxied onto the LEDs, and the submounts were attached to a header. The headers made convenient test vehicles for holding devices and making electrical connections.

The upper monocrystalline element 17 is identical to a corresponding element described in the aforementioned patent application of Blonder et al., and so its construction will not be reviewed in detail. The masking and etching may proceed as generally described with respect to the lower element 18; that is, the same $SiO_2$ masking and etch and silicon etch may be used as described above. After the fiber has been epoxied in the groove and the upper element 17 has been epoxied to lower element 18, a lid may be included on the top surface 22 as generally described in the Blonder et al. application. Various other mounting structures and electrical contacts may be made as generally described in the Blonder et al. patent application and elsewhere in the literature.

From the foregoing, it can be appreciated that the package of FIG. 1 provides for optimum optical coupling between the LED device 23 and the optical fiber 15, in a manner that is consistent with the use of a horizontally-extending V-groove for supporting the fiber and conventional metallization for making electrical contact to the LED 23. The final result is a package in which it is not necessary to bend the optical fiber to make it extend in a horizontal direction. This would not be true, for example, if the LED were made to be supported on a flat horizontal surface and the optical fiber extended axially in a vertical direction. The resulting 90° bend that would be required to bring the fiber to a horizontal position would be a source of mechanical stress, as well as optical transmission losses. Other designs could be configured in which the optical fiber extends at other angles from the package, but such configurations would normally be inferior to the ones shown in which the fiber extends in a horizontal direction.

Figure 6:
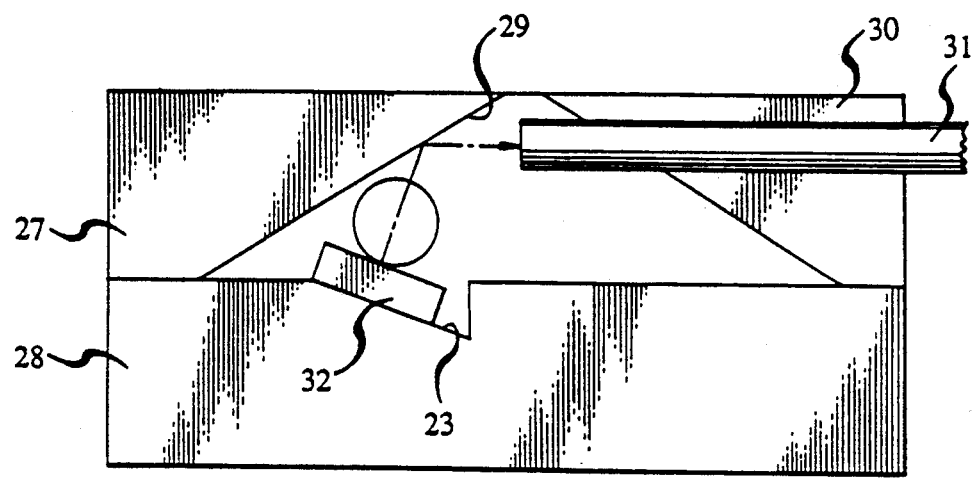
FIG. 6 is a schematic illustration of another embodiment of the invention.
Figure 7:
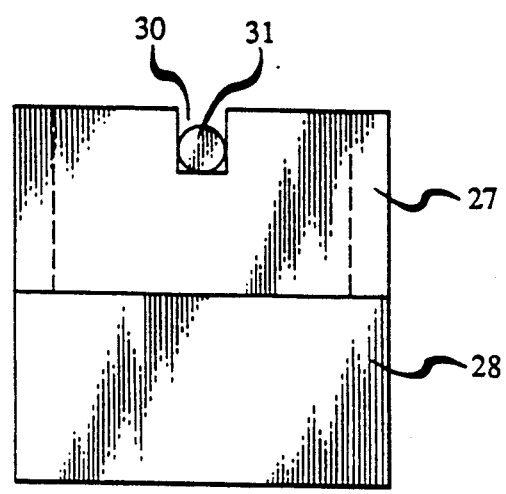
FIG. 7 is a view taken along lines 7—7 of FIG. 6.

FIGS. 6 and 7 illustrate an alternative embodiment of the invention comprising an upper monocrystalline silicon element 27 and a lower monocrystalline silicon element 28. The lower silicon element has a {112} crystallographic orientation which is essentially the same as the lower element 18 of FIG. 1, except that it has been rotated 180° with respect to the orientation shown in FIG. 1. Therefore, the effective angle $\beta$ of mount surface 23' with respect to the horizontal is $-19.48°$ rather than 19.48°. The upper silicon element 27 has a {110} orientation. With this orientation, etching from the bottom surface of element 27 will yield opposite sloping walls and opposite vertical walls. The reflector wall 29 will have an angle with respect to the horizontal of 35.26° which corresponds to a {111} crystallographic plane. It can therefore be seen that this combination of angles for surfaces 23' and 29 complies with Equation (4). The fiber groove is made by etching silicon element 27 from the top surface which, with the {110} orientation of element 27, yields the U-shaped groove 30 having a horizontal axis as shown in FIG. 6. With the U-shaped groove, of course, the fiber 31 will again extend in a horizontal direction. The vertical sidewalls of groove 30 correspond to the {111} planes. The LED 32 is mounted such as to project light that is reflected from reflecting surface 29 in a horizontal direction for optimum coupling into the optical fiber 31.

While the invention was stimulated by a need to provide optimum coupling between an LED and an optical fiber, it can be seen that it may be used in any optoelectronic device in which optimum coupling with a fiber is desired. For example, the LEDs of FIGS. 1 and 5 could be photodetectors which are optimally positioned by the package to receive light from the optical fiber. If lasers were made so as to emit light from the side opposite the side that is mounted on a support plane, then the invention would be applicable to such lasers. Silicon was chosen as the monocrystalline substance that seems to be the most practical for implementing the invention, but clearly other crystalline substances, such as germanium, could alternatively be used. While the relative angles obtained through etching are extremely precise, the absolute angles are dependent on the precision with which the monocrystalline elements were initially cut, as is known in the art. Various other modifications and embodiments may be made by those skilled in the art without departing from the spirit and scope of the invention.

I claim:

1. An optoelectronic device package comprising an optic fiber having an axis that extends in a first direction; a reflective surface; and an optoelectronic device included in an optical path that includes the axis of the optical fiber and the reflective surface, characterized in that:

the reflective surface is defined by a first crystallographic plane of a first monocrystalline element, the plane extending at a first angle with respect to the first direction;

the optoelectronic device is mounted on a second crystallographic plane of a second monocrystalline element having a crystal orientation different from that of the first monocrystalline element;

the second crystallographic plane extends at a second angle with respect to the first direction, whereby the optoelectronic device is oriented at a predetermined angle with respect to the optical path.

2. The optoelectronic device package of claim 1 further characterized in that:

the second angle is equal to $2\alpha - 90°$, where $\alpha$ is the first angle.

3. The optoelectronic device package of claim 2 further characterized in that:

the optical fiber is mounted in a groove defined by crystallographic planes in the first monocrystalline element.

4. The optoelectronic device package of claim 3 further characterized in that:

the first monocrystalline element is {100} silicon, the second monocrystalline element is {112} silicon; the first crystallographic plane is a {111} plane and the second crystallographic plane is a {111} plane.

5. The optoelectronic element of claim 4 further characterized in that:

the optical fiber is contained in a V-groove defined by {111} planes in the first monocrystalline silicon element.

6. The optoelectronic device of claim 5 further characterized in that:

the first angle is substantially 54.74° and the second angle is substantially 19.48°.

7. The optoelectronic device package of claim 1 further characterized in that:

the first monocrystalline element is {100} silicon, the second monocrystalline element is {112} silicon; the first crystallographic plane is a {111} plane; and the second crystallographic plane is a {111} plane.

8. The optoelectronic device of claim 7 further characterized in that:

the optical fiber is mounted in a groove defined by {111} crystallographic planes in the first monocrystalline element.

9. The method of claim 8 further characterized in that:

the first angle is substantially 35.26°, and the second angle is substantially $-19.48°$.

10. The optoelectronic device package of claim 1 further characterized in that:

the second angle is greater than zero degrees.

11. The optoelectronic device package of claim 1 further characterized in that:

the second angle is less than zero degrees.

12. The optoelectronic device package of claim 10 further characterized in that:
the first angle is greater than forty-five degrees.

13. The optoelectronic device package of claim 11 further characterized in that:
the first angle is less than forty-five degrees.

* * * * *